Nov. 22, 1938.   K. C. BUGG   2,137,524
GEAR MECHANISM
Filed April 15, 1935   5 Sheets-Sheet 1
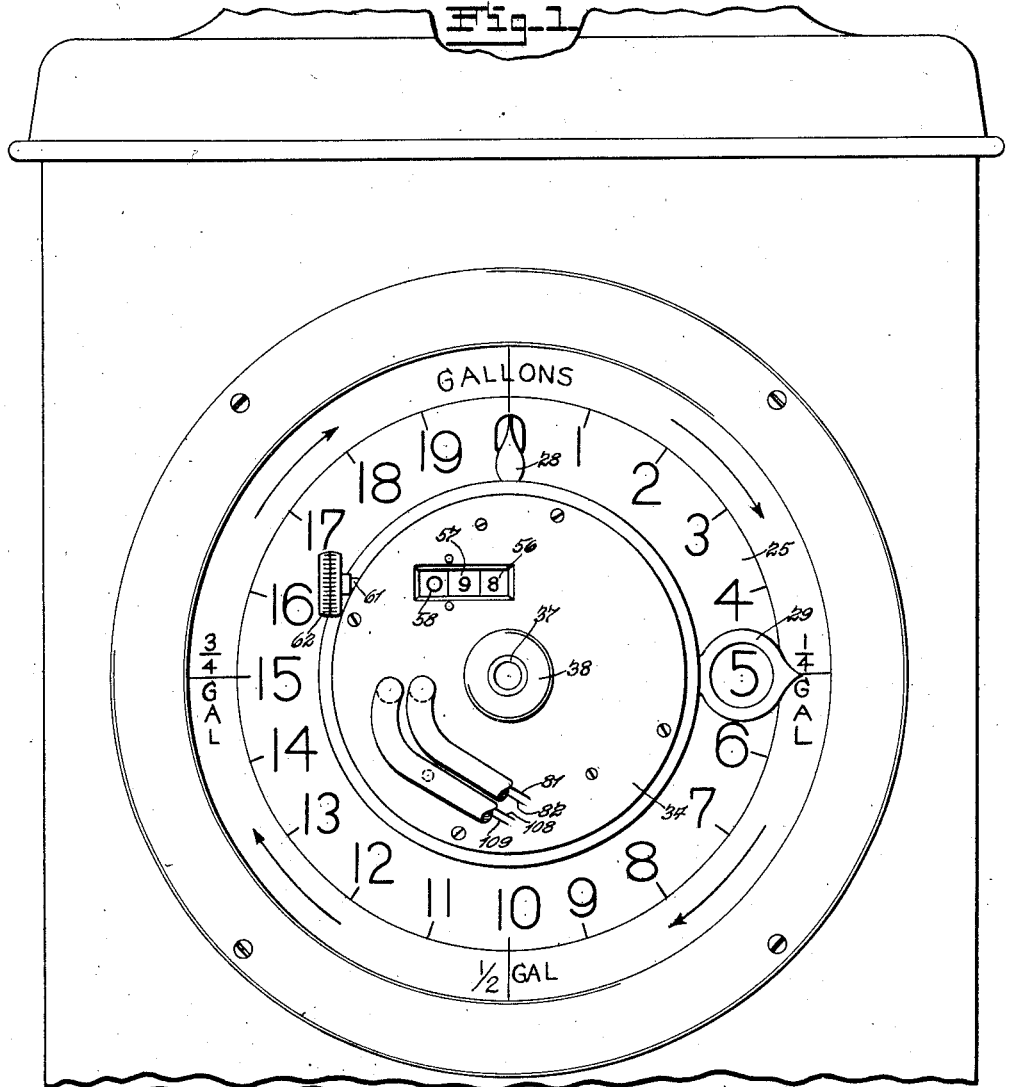
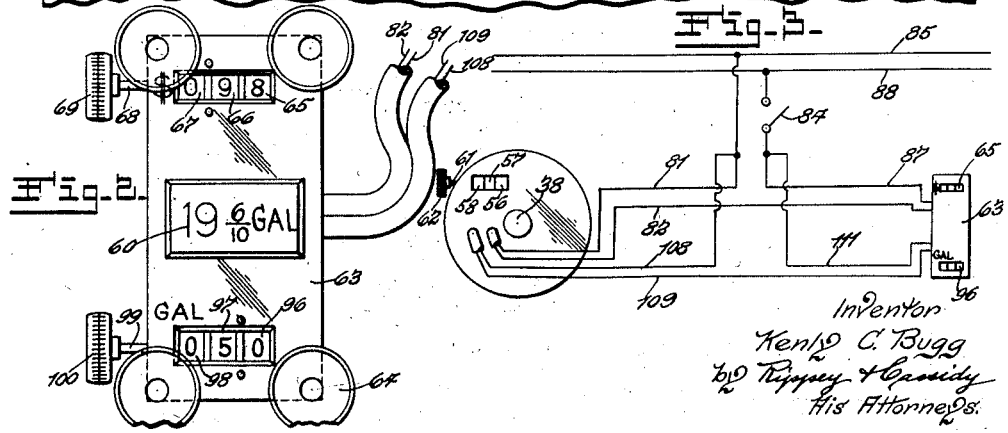
Inventor
Kenly C. Bugg
by Rynney & Cassidy
His Attorneys

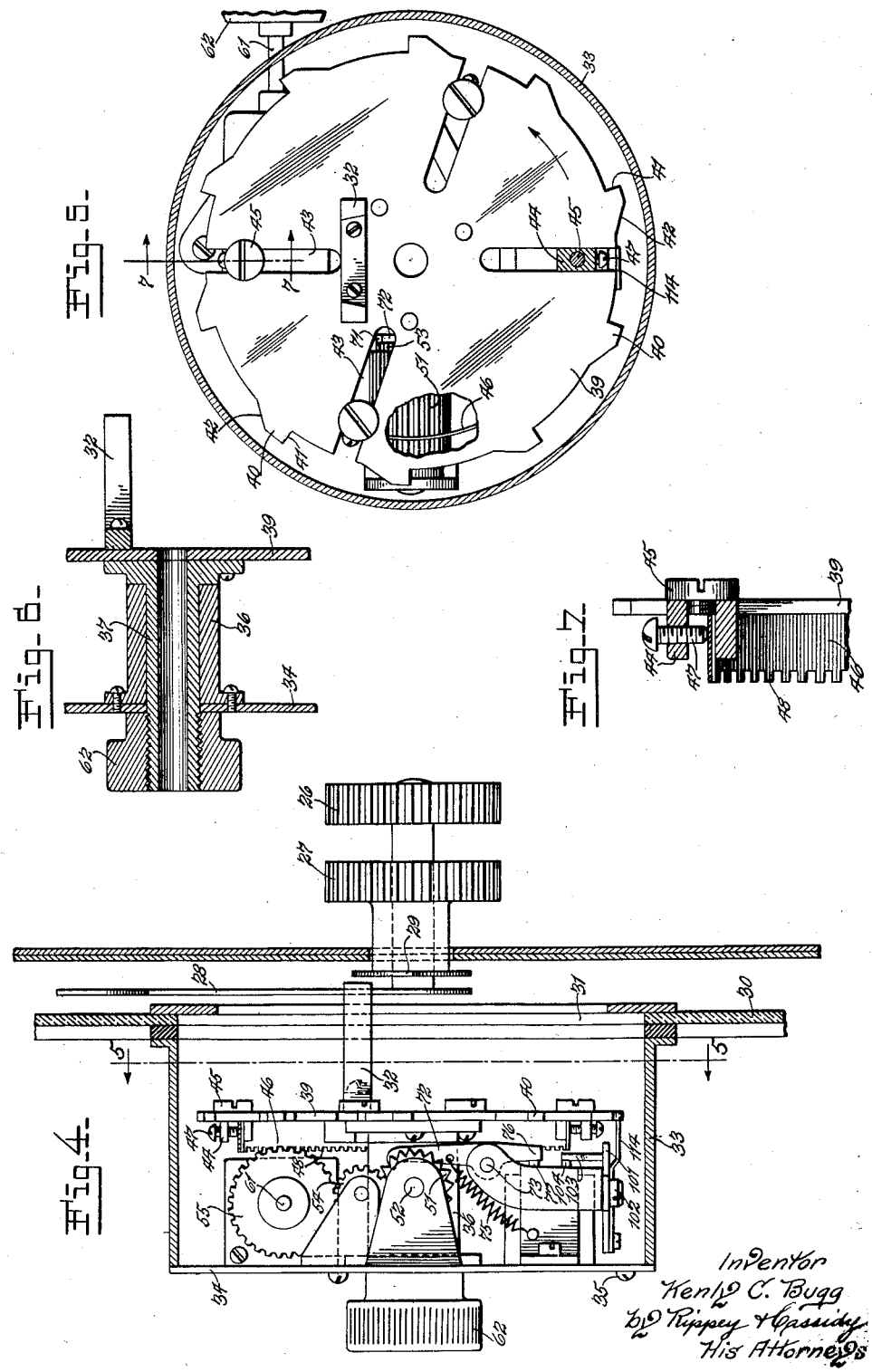

Nov. 22, 1938.  K. C. BUGG  2,137,524
GEAR MECHANISM
Filed April 15, 1935   5 Sheets-Sheet 3
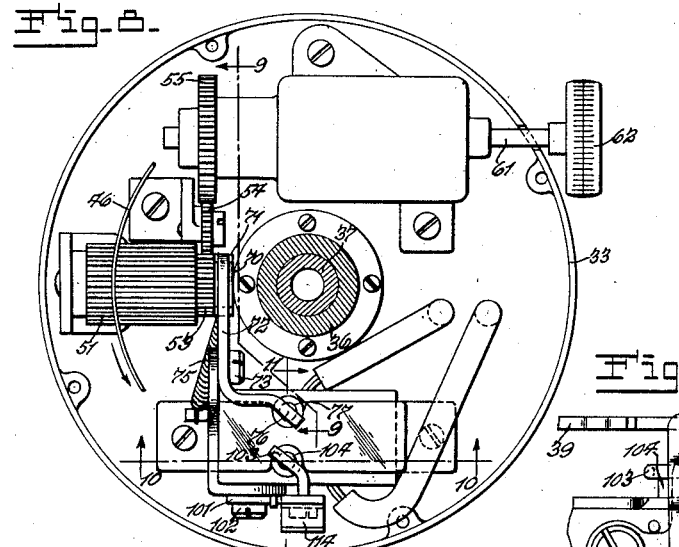
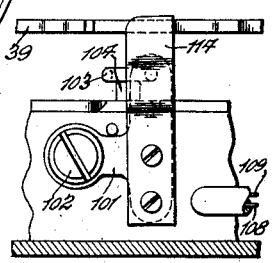
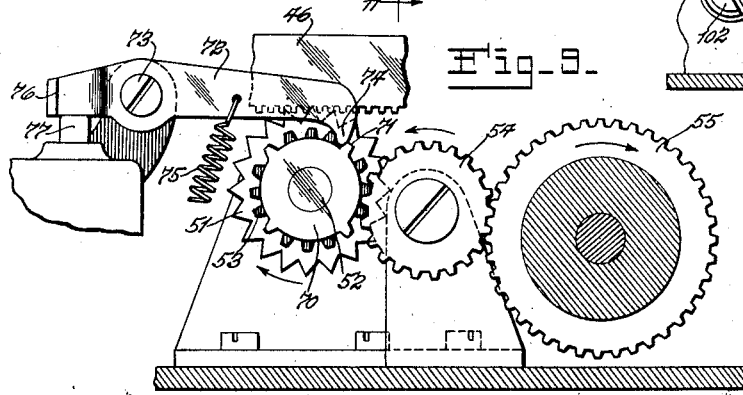
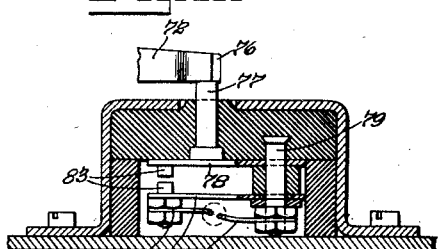
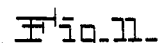
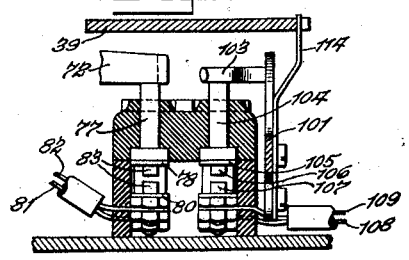
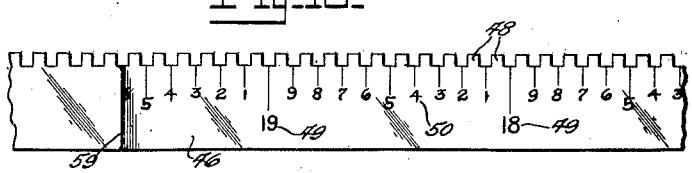

Nov. 22, 1938.   K. C. BUGG   2,137,524
GEAR MECHANISM
Filed April 15, 1935   5 Sheets-Sheet 4
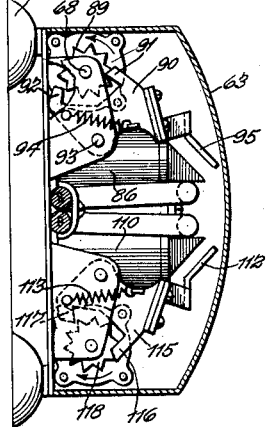
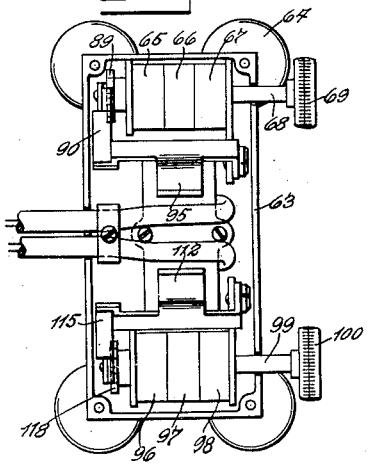
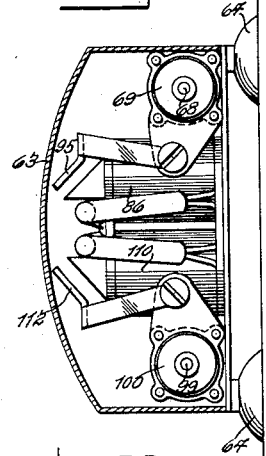
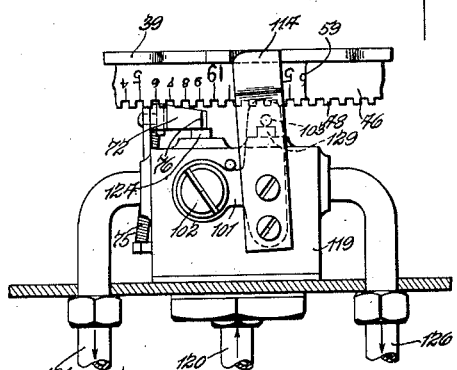
Inventor
Kenly C. Bugg
by Rippey & Cassidy
His Attorneys Nov. 22, 1938. K. C. BUGG 2,137,524
GEAR MECHANISM
Filed April 15, 1935 5 Sheets-Sheet 5
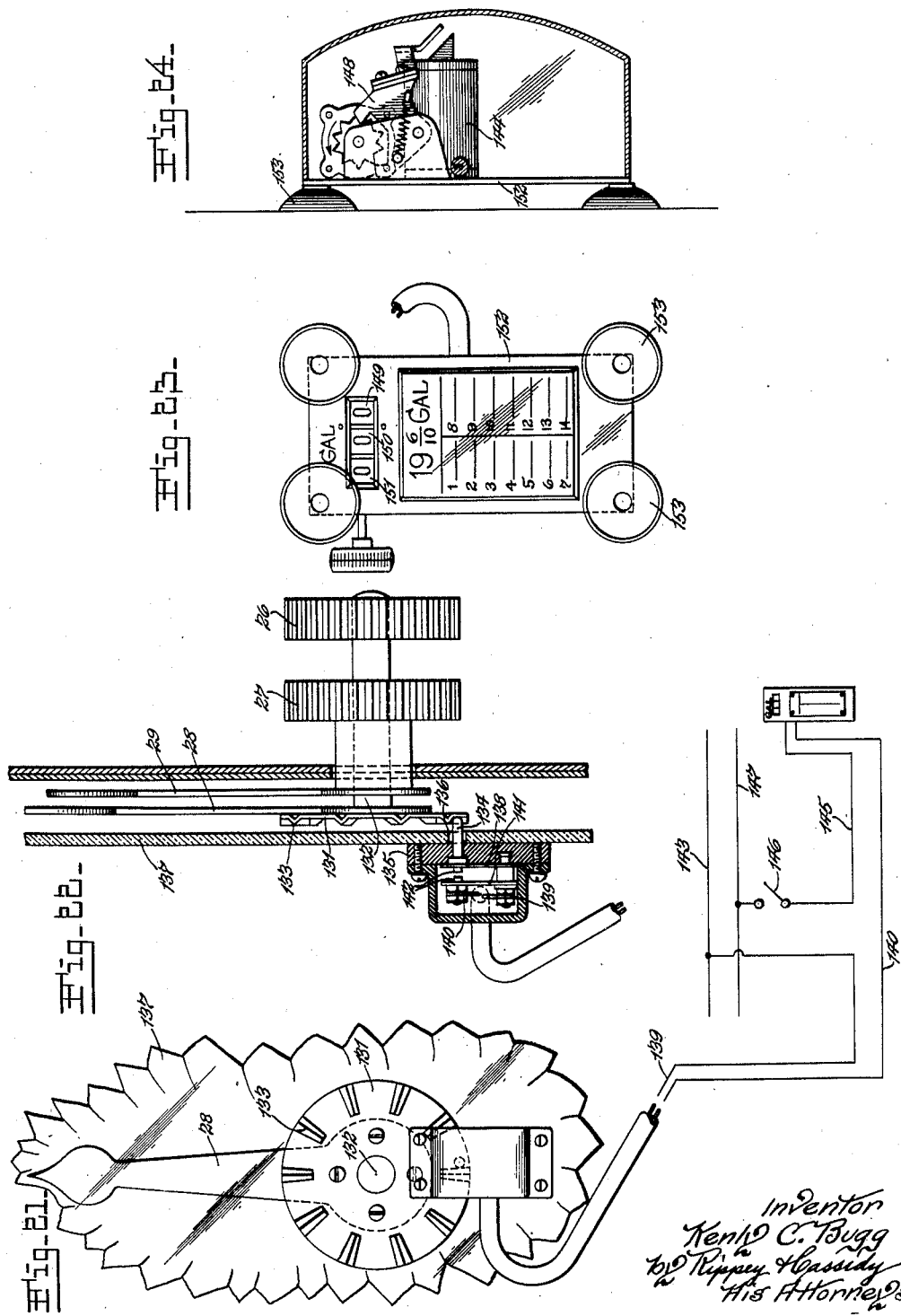

Patented Nov. 22, 1938

2,137,524

UNITED STATES PATENT OFFICE 2,137,524

GEAR MECHANISM

Kenly C. Bugg, Farmington, Mo.

Application April 15, 1935, Serial No. 16,375

17 Claims. (Cl. 74—412)

This invention relates to price computing mechanisms, and has special reference to mechanisms for computing and visually indicating the total charge or price for different amounts of liquids, such as gasoline, oil, and the like. However, the utility of this invention is not restricted, and it will be made apparent that the invention may be applied to various uses.

Objects of the invention are to provide a computing mechanism adapted to be applied to a gasoline measuring and dispensing pump of the familiar type in general use by gasoline service stations, and which mechanism is operated by the flowing liquid to indicate visually the price or charge for the amount of gasoline or other liquid dispensed by the pump; to provide improved mechanism adapted to be operated by one of the usual pointers or other operating part of the pump to operate the computing mechanism, and, in the present instance, the fractional pointer is utilized for this purpose; to provide a device operated under control of the price or charge computing mechanism for indicating the amount of liquid dispensed by the pump; to provide an additional device, also operated under control of the computing mechanism and supported at a point remote therefrom for computing and visually indicating to the purchaser the charge or price; and, generally, to provide a price computing mechanism that will attain all of its intended objects and purposes efficiently and satisfactorily and which can be manufactured and sold at permissible cost.

Numerous other objects and advantages of the invention will be apparent from the following description, reference being made to the annexed drawings, in which—

Fig. 1 is an elevation of the computing mechanism mounted in connection with the gasoline pump.

Fig. 2 is an elevation of the price computing mechanism and the device for displaying an indication of the amount of liquid dispensed by the pump, together with means for supporting the same in a position remote from the pump and adjacent to the customer.

Fig. 3 is a diagrammatic view illustrating the electrical connections for operating the remote computing mechanism under control of the computing mechanism that is mounted on the pump.

Fig. 4 is a side elevation of the computing mechanism mounted in connection with the pump, the casing being shown in section.

Fig. 5 is a view looking toward the rear of the computing mechanism along the line 5—5 of Fig. 4.

Fig. 6 is a sectional view of the manual device for resetting the actuator that operates the computing mechanism and the fractional pointer in their starting or unoperated positions.

Fig. 7 is a sectional view on the line 7—7 of Fig. 5, showing the support for the annular rack that operates the computing mechanism.

Fig. 8 is an inner or rear elevation of the computing mechanism and the devices controlled thereby for operating the remote computing mechanism.

Fig. 9 is an enlarged view showing the gearing for operating the computing mechanism, and also illustrating a part of the devices for operating the remote computing mechanism.

Fig. 10 is a sectional view of an electric switch utilized to control the operation of the remote computing mechanism.

Fig. 11 is a sectional view showing the same switch and an additional switch controlling the operation of the device that indicates the amount of liquid dispensed by the pump.

Fig. 12 is an extended view of a portion of the annular rack that operates the computing mechanism.

Fig. 13 is an elevation of the device operated under control of the computing mechanism illustrated in the preceding views of the drawings for controlling operation of a remote counting and indicating device.

Fig. 14 is an end elevation of the remote computing device and the device that indicates the amount of liquid dispensed by the pump, the housing for these mechanisms being in section.

Fig. 15 is an elevation of said devices, the housing therefor being removed.

Fig. 16 is a view showing the opposite end of the devices that are shown in Fig. 14.

Fig. 17 is an elevation of a computing device operated by air instead of by electrical mechanism.

Fig. 18 is a sectional view on the line 18—18 of Fig. 17, showing the air passages for operating the devices shown in Fig. 19.

Fig. 19 is a view showing the means for utilizing the air blasts to operate the devices shown in Fig. 13.

Fig. 20 is a sectional view on the line 20—20 of Fig. 17.

Fig. 21 is a view showing a device operated by the fractional pointer of the pump for controlling electrical operation of a remote computing and indicating device.

Fig. 22 is a sectional view of the mechanism shown in Fig. 21.

Fig. 23 is an elevation of the remote computing or counting device operated by the mechanism shown in Fig. 21.

Fig. 24 is an elevation of the computing or counting device, the casing being in section.

As shown, a preferred embodiment of the present invention is mounted and supported in connection with the usual counting dial 25 of a gasoline dispensing pump. The flowing gasoline that is discharged from the pump operates connections for rotating the pinions 26 and 27 operatively connected with the fractional pointer 28 and gallon pointer 29, respectively.

As shown in Fig. 1, the gallon pointer 29 has moved to a position indicating that five gallons of liquid have been dispensed by the machine. The fractional pointer 28 is at its unoperated or zero position which, when observed in connection with the gallon pointer, indicates that exactly five gallons of liquid have been dispensed. It is known that the gallon pointer 29 advances one step from one digit to another only after the units pointer 28 has moved a complete revolution from its starting or zero position to said starting or zero position.

To provide for operation of the present invention by the usual fractional pointer 28 of the pump, the transparent panel 30 is provided with an opening 31 through which the fork 32, constituting an element of my invention, extends. The arms of the fork 32 receive the fractional pointer 28 between them so that, when the fractional pointer is rotated by the pinion 26, the fork 32 will be moved thereby.

The price computing mechanism that is mounted on the pump is enclosed in a casing 33 attached to the panel 30 around the opening 31. The casing 33 includes a removable and replaceable outer end wall 34 secured to the casing by removable and replaceable screw fasteners 35. A bearing 36 (Fig. 6) is attached to the inner side of the casing end wall 34. A tubular rod 37 is rotative in the bearing 36 and has a knob 38 attached to its outer end adjacent to the wall 34 and preventing inward movement of the tubular rod 37. The inner end of the tubular rod 37 is attached to a plate 39 having on its periphery ten projections 40, the front edges 41 of which are abrupt and are approximately radial, while the rear edges 42 are inclined. As seen in Fig. 1, the fractional pointer 28 and also the gallonage pointer 29 rotate in a clockwise direction when said pointers are operated by the liquid being dispensed from the pump. It is now apparent that, when the fractional pointer 28 moves the fork 32, the plate 39 is rotated in a clockwise direction, according to Fig. 1, and in a counter-clockwise direction, as seen in Fig. 5.

The plate 39 is formed with a series of radial slots 43 in each of which a bracket 44 (Figs. 5 and 7) is mounted and secured in any selected adjustment by a screw 45. An annular rack 46 extends through the brackets 44 and is clamped against said brackets by set screws 47. One edge of the rack 46 is against the outer surface of the plate 39, so that said rack cooperates with the screws 45 to hold the brackets 44 in any adjustment in which they may be placed. The rack 46 is a resilient strip of metal rolled into annular form with its ends overlapping so that it is easily possible to vary the diameter of the annular rack by loosening the screws 47 and 45 and moving the brackets 44 to the selected positions, and then tightening said screws to secure the brackets and the rack in said positions.

The outer edge of the rack comprises series of teeth 48, there being ten teeth in each series, and, if desired, the respective series may be numerically designated by numerical designations 49, and the teeth, or the spaces between the teeth, of each series may be numerically designated by designations 50.

The rack 46 is in permanent mesh with an elongated pinion 51 (Figs. 5 and 9) mounted for rotation on an axle 52. The pinion 51 is formed with twenty teeth which, as shown, are pointed. The distance between the extremities of any two adjacent teeth on the pinion 51 is sufficient to receive two adjacent teeth 48 on the rack 46. Thus, when the rack 46 is moved a distance of two teeth 48, the pinion 51 is turned a distance of one tooth.

A pinion 53 is rigid with and rotated by the pinion 51 and is in permanent mesh with an intermediate pinion 54 that meshes permanently with the pinion 55 that operates the usual commercially available and familiar counter comprising at least a units counting element 56, a tens counting element 57 and a hundreds counting element 58. It is known that these counting elements are rotative and will transfer from lower to higher denominational orders. In the present invention, I utilize these familiar and commercially available counters and their function to transfer from lower to higher denominational orders in the known manner.

As shown in Fig. 12, the rack 46 is adjusted to operate the counter members 56, 57 and 58 properly when the gasoline is sold at nineteen and six-tenths cents (19.6¢) per gallon. The rack 46 may be adjusted to operate the counter mechanism properly at any of the prices at which gasoline is usually sold. The adjustment is made simply by loosening the screws 45 and 47 and changing the form and circumference of the rack until the rack end 59 (Fig. 12) registers with the proper numerical designation 50 beyond the proper designation 49. Thus, it may be said designations 49 denote the cents price per gallon, and that the designations 50 denote the fractions of cents included in the gallonage price. Thus the setting of the rack as shown in Fig. 12, in which the end 59 indicates a price of nineteen and six-tenths cents (19.6¢) per gallon, is in accordance with the posted price designation 60 (Fig. 2).

The ratio and relationship of the parts for operating the counter with respect to each other and with respect to the fractional pointer 28 are such that, when gasoline to the value of one cent (1¢) is discharged from the pump, the counter unit 56 will be moved to display the next higher digit thereon or to operate the counter element 57 in a transfer operation. According to the specific ratio indicated, the passage of the teeth 48 on the rack 46 will rotate the pinion 51 a distance of five teeth, and will rotate the pinion 55 four teeth, as a result of which the units counter element 56 is moved to display the next higher digit thereon or to operate the tens counting unit 57 in a transfer operation, as required.

The counter comprising the elements 56, 57 and 58 may be cleared and restored to zero after each pumping operation has been completed. The usual shaft or spindle 61 of the counter extends through the casing wall 33 and is equipped with a knob handle 62 which may be manually operated to clear the counter and reset the elements thereof in their cleared or zero positions ready for another operation. The return of the fractional pointer 28 to its starting position at zero on dial 25 will operate the rack 46 and the gearing 51, 54 and 55 in a reverse direction; but, because of the known construction of the standard counter, such reverse rotation of the gearing does not affect the counter members 56, 57 and 58.

The mechanism just described is supported in connection with the panel 30 for operation by the fractional pointer of the pump. However, it should be apparent that the mechanism may be mounted in other positions and may be operated otherwise than by the fractional pointer of the pump.

The mechanism described constitutes a complete invention. In some instances, it is desirable to operate either a money counter or a gallonage counter, or both, supported remote from the pump. For instance, the remote counter or counters may be temporarily supported in connection with the windshield of the automobile that is being supplied with gasoline in position for convenient observation by the driver.

The casing 63 supports and encloses a money counter and a gallonage counter, and is provided with elastic vacuum cups 64 whereby the device may be temporarily attached to the windshield by compressing the cups to exclude the air therefrom, as understood.

The money counter is a duplicate of the counter already described, and comprises a units counter 65, a tens counter 66 and a hundreds counter 67 (Fig. 2) mounted on a spindle 68 having a knob 69 thereon to reset or clear the counter after each transaction has been completed. This remote money counter may be operated by electrical equipment under control of the operating mechanism for the counter that is supported by the pump. As shown, a cam disc 70 (Fig. 9) is rigid with the pinions 51 and 53 and has four cams 71 formed on its periphery. The cam disc 70 is rotated with the pinions 51 and 53. A lever 72 mounted on a pivot 73 has a rounded end portion 74 engaging the periphery of the cam disc 70 in position to be intermittently operated by the respective cams 71 during rotation of the cam disc. As already indicated, the ratio of the gearing and the operating mechanism therefor is such that each complete rotation of the pinion 51 will turn the units counter 56 four steps to register four additional cents, and each one-fourth of a complete rotation of the pinion 51 will operate the units counter member 56 one step to register one additional cent. Consequently, every time the units counter member 56 is advanced one digit, the lever 72 is operated by one of the cams 71. A spring 75 yieldingly holds the end 74 of the lever 72 upon the cam disc 70.

The opposite end 76 of the lever 72 seats upon a push member 77 of an electric switch. The electric switch includes a resilient metallic switch element 78 (Fig. 10) supporting the push member 77 and mounted on a post 79, on which the cooperating switch member 80 also is mounted. The switch member 80 is insulated from and is out of electrical communication with the post 79. The circuit wires 81 and 82 are connected with the post 79 and the switch member 80, respectively. The contact points 83 of the switch are held apart by the resiliency of the switch element 78 until the push member 77 is pushed downwardly by the lever 72 when said lever 72 is operated by one of the cams 71.

The electric circuit includes a manually operative switch 84 (Fig. 3) the closing of which conditions the electric circuit for operation, since the wire 81 leads to the line wire 85 and the wire 82 leads to an electro-magnet 86, from which a wire 87 leads through the switch 84 to the line wire 88. Consequently, when the switch 84 is closed, operation of the lever 72 to effect contact of the contact points 83 will close the electric circuit and energize the electro-magnet 86.

It is now apparent that the electro-magnet 86 is energized intermittently during rotation of the cam disc 70, and that such intermittent operation is effected four times during each complete revolution of said cam disc 70.

The known type of counter including the members 65, 66 and 67 also includes a pinion 89 (Fig. 14) and a lever 90 having end portions 91 and 92 for engaging and turning the pinion 89 step by step when the lever 90 is operated. The lever 90 is supported on a pivot 93 and is operated in one direction by a spring 94, as is well known.

My invention comprises means for operating the lever 90 in opposition to the spring 94 by the electro-magnet 86 when said magnet is intermittently operated as described. Said means consists of an armature element 95 attached to the free end of the lever 90 in position to be attracted and moved by the electro-magnet when the electro-magnet is operated.

It is apparent that, when any cam 71 moves beyond the end 74 of the lever 72, the switch member 78 will open the circuit and deenergize the electro-magnet 86, whereupon the spring 94 operates the lever 90 away from the electro-magnet. When the lever 90 is operated by the electro-magnet 86, the end portion 92 will turn the pinion 89 one-half step, or a distance of one-half tooth, and, when the lever 90 is operated by the spring 94, the end portion 91 will turn the pinion 89 one-half step. The two half steps through which the pinion 89 is turned at each operation of the lever 90 by the electro-magnet and the spring 94 constitute one-tenth of a revolution and, by such movement of the pinion 89, as is known, the units counting element 65 is advanced one digit. Transferring from lower to higher denominational orders in the counter comprising the members 65, 66 and 67 is effected in the same way as in the counter that is supported by the pump and in a manner that is familiar.

The gallonage counter comprising the member 96 for indicating tenths of gallons, the units of gallons member 97 and the tens of gallons member 98 is a duplicate of the counters already described, and has its spindle 99 equipped with a knob 100 for the usual clearing and resetting operations.

A lever 101 (Fig. 13) is mounted on a pivot 102 and supports a pin 103 projecting over a push member 104 of an electric switch which is a duplicate of the electric switch illustrated in Fig. 10. The resilient switch member 105 yieldingly supports the push member 104 and holds the contact point 106 spaced from the cooperating contact point 107. The electric circuit wires 108 and 109 are in electrical communication with the contact members 106 and 107, respectively. The wire 108 is connected with the wire 81, and thereby with the line wire 85, and the wire 109 leads to an electro-magnet 110 from which a wire 111 leads to connection with the wire 87 and thence through the switch 84 to the wire 88. Consequently, when the switch is closed by downward movement of the switch member 104, the electromagnet 110 is energized and moves the armature 112 in opposition to the spring 113. A resilient blade 114 is attached to the lever 101 and projects upwardly across the periphery of the plate 39. Every time the plate 39 is turned a distance equal to one-tenth of a revolution by the fractional pointer 28, the shoulder 41 on one or another of the projections 40 engages the blade 114 and thereby operates the lever 101 to cause the pin 103 to push the push member 104 downwardly and close the electric switch from which the wires 108 and 109 lead. Movement of the projection 40 beyond the blade 114 permits the resiliency of the switch member 105 to open the switch and thereby deenergize the electro-magnet 110 to permit the spring 113 to operate the lever 115 on which the armature 112 is mounted. The lever end portions 116 and 117 rotate the pinion 118 one-tenth of a revolution at each operation of the lever 115 by the electro-magnet 110 and the spring 113, thereby turning the gallonage units counter member 96 a distance of one digit.

This intermittent operation of the gallonage counter units member 96 is effected each time the plate 39 moves one-tenth of a revolution. When the plate 39 is turned in the reverse direction from that in which it is turned by the fractional pointer 28, the inclined edges 42 will bend the blade 114 outwardly and will not operate the lever 101 and, consequently, will not close the switch controlled thereby. Therefore, the electro-magnet 110 is not energized during the reverse rotation of the plate 39 by the return or counter-clockwise movement of the fractional pointer 28.

Thus, my invention, in one embodiment thereof, may comprise a counter mounted on the pump and operated by the liquid being dispensed, and may also comprise a money counter and a gallonage counter supported remote from the pump and close to the driver of the automobile being served. In this way, both the attendant and the driver may conveniently observe the price or cost of the gasoline discharged from the pump, and the driver may also observe the amount of gasoline discharged from the pump. After the service is complete, the counting mechanism that had been applied to the windshield of the automobile is detached from the windshield and reset preparatory for additional use.

Instead of operating the remote counters by electrical mechanism under control of the device that is mounted on the pump, the remote counters may be operated pneumatically by mechanism under control of the device that is mounted on the pump.

In the pneumatic mechanism, I dispense with the electric switches that are mounted in the casing 33 and substitute therefor valve devices. As shown (Fig. 17), a valve casing 119 is mounted in the casing 33. A pipe 120 opens into the valve casing 119 (Fig. 20). A tube or hose 121 has one end opening into the valve casing 119, and has its opposite end equipped with a nozzle 122 in the casing 63 adjacent to a plate 123 mounted on the lever 90 and taking the place of the register 95 in the electrically operated device. A valve 124 is mounted in the valve casing 119 and is supported by a resilient plate 125 in position to close the outlet from the valve casing to the tube or hose 121. The stem of the valve 124 is engaged by the end 76 of the lever 72 and is intermittently pushed downwardly by operation of said lever exactly as the push member 77 is intermittently pushed down by said lever 72. When the valve 124 is opened, a blast of air is discharged from the nozzle 122 against the plate 123, and the lever 90 is thereby operated the same as it is operated when the electro-magnet 86 is intermittently energized. Each intermittent operation of the lever 90 advances the units counter member 65 one digit. A tube or hose 126 also has one end opening into the valve housing 119 and its opposite end equipped with a nozzle 127 (Fig. 19) in the casing 63 adjacent to a plate 128 on the lever 115. A valve 129 in the valve housing 119 is supported by a resilient plate 130 in position to close communication from the valve housing to the tube or hose 126. The stem of the valve 129 is engaged by the pin 103, and said valve 129 is opened intermittently during rotation of the plate 39 exactly as the electric switch controlled by the pin 103 is closed intermittently in the electrically operated device. When the valve 129 is opened, a blast of air is discharged against the plate 128 and the lever 115 is thereby operated first by the blast of air and then by the spring 113 to rotate the gallonage units counting member 96 one step or digit.

It will be understood that the casing 63 has openings for the free passage of air therefrom.

It should now be apparent that an embodiment of the invention is complete with the counting mechanism mounted on the pump only, and the remote counting mechanism being omitted. The invention may also comprise an embodiment in which the counting mechanism on the pump is omitted, and a remote counting mechanism provided and operated by means under control of the fractional pointer. This last mentioned embodiment in which the counting mechanism is omitted from the pump and the remote counting mechanism operated under control of the fractional pointer is illustrated in Figs. 21 to 24, inclusive.

The fractional pointer 28 and gallon pointer 29 of the pump are operated by the pinions 26 and 27, respectively, in the manner already described. A disc 131 is attached to the fractional pointer 28 concentrically with the axle 132 that supports and rotates the fractional pointer. The disc 131 is formed with an annular series of radial cams 133 which constitute actuators for a push member 134. The push member 134 is mounted for sliding movements in the insulation base 135 of an electric switch and extends through a hole 136 in the transparent panel 137, so that the inner end of the push member 134 is adjacent to the margin of the disc 131 and will be engaged intermittently by the cams 133 and thereby pushed outwardly. A resilient switch member 138 is in electrical communication with a switch member 141. When the push member 134 is pushed outwardly by any of the cams 133, the contact points 142 of the electric switch are brought together and the electric circuit is closed. The wire 139 is connected with a line wire 143 and the wire 140 leads to an electro-magnet 144 from which a wire 145 leads to a switch 146. When the switch 146 is closed, the wire 145 is in electrical communication with a line wire 147. Upon the closing of the circuit, electro-magnet 144 is energized, the lever 148 is operated, and the units member 149 of the counter is advanced one digit. The counter comprises a tens counting member 150 and a hundreds counting member 151. This counter is a duplicate of the counter comprising the counter members 96, 97 and 98, and is a gallonage counter, although, of course, a price or money counter may be used if desired.

Thus, upon the discharge of each gallon of gasoline from the pump, one of the cams 133 will close the circuit and cause the units counting member 149 to be advanced one digit.

The housing 152 containing the counter mechanism may be provided with attaching supports 153 similar to the vacuum cups 64, whereby the device may be attached to the windshield of the automobile being served in order to support the counter in position for convenient observation by the customer.

The invention may be widely varied in other particulars without departure from the nature and principle thereof. I do not restrict myself unessentially, but what I claim and desire to secure by Letters Patent is:—

1. In a mechanism of the character described having an element to be operated; a rotary support, an elongated pinion rotative about an axis disposed angularly with respect to the axis of rotation of said support, gearing driven by said pinion for operating said element, a rack concentric with the axis of said support for rotating said pinion, and devices attaching said rack to said support to engage said pinion at selected positions along the length thereof.

2. In a mechanism of the character described having an element to be operated, and an actuator; a rotary support, means for rotating said support by said actuator, an elongated pinion rotative about an axis disposed angularly with respect to the axis of rotation of said support, gearing driven by said pinion for operating said element, a rack, and means holding said rack in selected adjustments on said support to engage said pinion in selected positions along the length thereof.

3. In a mechanism of the character described having an element to be operated, and an actuator; a rotary support, means for rotating said support by said actuator, an elongated pinion rotative about an axis disposed angularly with respect to the axis of rotation of said support, gearing driven by said pinion for operating said element, a rack concentric with the axis of said support for rotating said pinion, and devices for attaching said rack to one side of said support in selected positions to engage said pinion in selected positions along the length thereof.

4. In a mechanism of the character described having an element to be operated; a rotary support, an elongated rotary pinion, gearing driven by said pinion for operating said element, an annular rack in connection with said support permanently engaging said pinion for rotating said pinion when said support is rotated, and means for varying the circumferential length of said rack to engage said pinion in selected positions along the length thereof.

5. In a mechanism of the character described having an element to be operated; a rotary support, an elongated rotary pinion, mechanism controlled by said pinion for operating said element when said pinion is rotated, an annular rack in connection with said support permanently engaging said pinion for rotating said pinion when said support is rotated, means for varying the circumferential length of said rack to engage said pinion in selected positions along the length thereof, and devices for rotating said support.

6. In a mechanism of the character described having two elements to be operated; a rotary support, means for rotating said support, an elongated rotary pinion, mechanism operated by said pinion for operating one of said elements, mechanism controlled by said pinion for operating the other one of said elements, an annular rack concentric with said support and extending at right angles therefrom, and means holding said rack in selected adjustments on said support to engage said pinion in selected positions along the length thereof.

7. In a mechanism of the character described having an element to be operated; a rotary support, an elongated rotary pinion, an annular rack engaging said pinion, means for supporting said rack in connection with said support in different adjustments in each of which adjustments the circumferential length of said rack is different from the circumferential length thereof in any other adjustment and in each of which adjustments said rack engages said pinion in a different position along the length thereof, and mechanism controlled by said pinion for operating said element during rotation of said pinion.

8. In a mechanism of the character described having an element to be operated, and gearing for operating said element; a rotary support, an elongated pinion rotative about an axis disposed at an angle with respect to the axis of rotation of said support for operating said gearing, a rack engaging said pinion for rotating the same, and means for supporting said rack in connection with said support in different adjusted positions in each of which the circumferential length of said rack is different from the circumferential length thereof in any other adjusted position of said rack and in each of which positions said rack engages said pinion in a different position along the length thereof.

9. In a mechanism of the character described having an element to be operated, and gearing for operating said element; a rotary support, an elongated pinion rotative about an axis disposed at an angle with respect to the axis about which said support rotates, means for rotating said support, an annular rack engaging said pinion and extending at right angles from said support, and elements in connection wtih said support for supporting said rack in different adjusted positions in each of which the circumferential length of said rack is different from the circumferential length thereof in any other adjusted position of said rack and in each of which positions said rack engages said pinion in a different position along the length thereof.

10. In a mechanism of the character described having an element to be operated; an elongated rotary pinion, gearing operated by said pinion for operating said element, an expansible and contractable annular rack for rotating said pinion, means for holding said rack in different expanded and contracted positions to vary the circumferential length thereof and to hold said rack in engagement with said pinion in selected positions along the length thereof, and means for rotating said rack.

11. In a mechanism of the character described having elements to be operated; an elongated rotary pinion, an annular rack engaging one of said elements for operating the same, means for holding said rack in different expanded and contracted positions in each of which the circumferential length of said rack differs from the circumferential length thereof in any other position and to hold said rack in engagement with said pinion in selected positions along the length thereof, and means for rotating said rack.

12. In a mechanism of the character described, a rotary support having an annular series of radial slots, means for rotating said support, a rack concentric with the axis of said support, and clamping devices mounted in said slots and attaching said rack to said support for rotation thereby.

13. In a mechanism of the character described, a rotary support having an annular series of radial slots, means for rotating said support, a rack, and means attached to said rack and engaged in said slots and attaching said rack to said support for rotation thereby and for varying the circumferential length of said rack.

14. In a mechanism of the character described, a rotary support having an annular series of radial slots, means for rotating said support, a rack, means secured to said rack and engaged in said slots and attaching said rack to said support for rotation thereby and for varying the circumferential length of said rack, and an elongated pinion supported for rotation about an axis at right angles to the axis of said rack and engaging said rack in any of the circumferential lengths of said rack.

15. In a mechanism of the character described, a support mounted for rotation about a horizontal axis and having an annular series of radial slots, a pinion mounted for rotation about an axis at right angles to the axis of said support, a rack in permanent engagement with said pinion, and devices attached to said rack and engaged in said slots for supporting said rack in connection with said support in a relationship to rotate said pinion.

16. In a mechanism of the character described, a support mounted for rotation about a horizontal axis and having an annular series of radial slots, a pinion mounted for rotation about an axis at right angles to the axis of said support, a rack in permanent engagement with said pinion, and means attached to said rack and engaged in said slots for attaching said rack to said support for rotation thereby and for varying the circumferential length of said rack to rotate said pinion in any of the adjustments of said rack.

17. In a mechanism of the character described, a support mounted for rotation about an approximately horizontal axis and having an annular series of radial slots, means for rotating said support, a pinion supported for rotation about an axis at right angles to the axis of said support, means secured to said rack and engaged in said slots for attaching said rack to said support for rotation thereby and for holding said rack at different circumferential lengths in mesh with said pinion, and mechanism to be operated under control of said pinion.

KENLY C. BUGG.